United States Patent
Marsee

[15] 3,646,921
[45] Mar. 7, 1972

[54] REDUCING ENGINE EMISSIONS
[72] Inventor: Frederick J. Marsee, Clawson, Mich.
[73] Assignee: Ethyl Corporation, New York, N.Y.
[22] Filed: July 17, 1969
[21] Appl. No.: 857,255

Related U.S. Application Data
[63] Continuation-in-part of Ser. No. 611,346, Jan. 24, 1967, abandoned.

[52] U.S. Cl. ........................................123/117 A, 123/117 R
[51] Int. Cl. ........................................................F02p 5/04
[58] Field of Search..........................123/117.1, 117, 146.5 C

[56] References Cited

UNITED STATES PATENTS

| | | |
|---|---|---|
| 2,336,424 | 12/1943 | Schachenman..........................123/117 |
| 2,621,641 | 12/1952 | Sterner..................................123/117 |
| 2,650,581 | 9/1953 | Short et al. ............................123/117 |
| 2,732,833 | 1/1956 | Hook......................................123/117 |
| 2,825,320 | 3/1958 | Brueder..................................123/117 |
| 2,864,356 | 12/1958 | Udale.....................................123/117 |
| 3,157,168 | 11/1964 | Sterner et al. ........................123/117 |
| 3,272,191 | 9/1966 | Walker et al. .........................123/117 |
| 3,431,897 | 3/1969 | Eltinge..................................123/117 |
| 3,472,213 | 10/1969 | Walker...................................123/117 |
| 3,476,094 | 11/1969 | Rucins et al. ..........................123/117 |

*Primary Examiner*—Wendell E. Burns
*Attorney*—Donald L. Johnson

[57] ABSTRACT

At part-throttle accelerations, ignition timing of spark-ignition engine is sharply retarded for at least a few seconds to reduce hydrocarbon and nitrogen oxide emissions from exhaust. Retarding can be made responsive to throttle-opening movement or acceleration inertia of rotating part of engine. Fluid-flow and electric-heating arrangements are shown for determining the length of the retard period.

11 Claims, 19 Drawing Figures

PATENTED MAR 7 1972 3,646,921
SHEET 1 OF 4
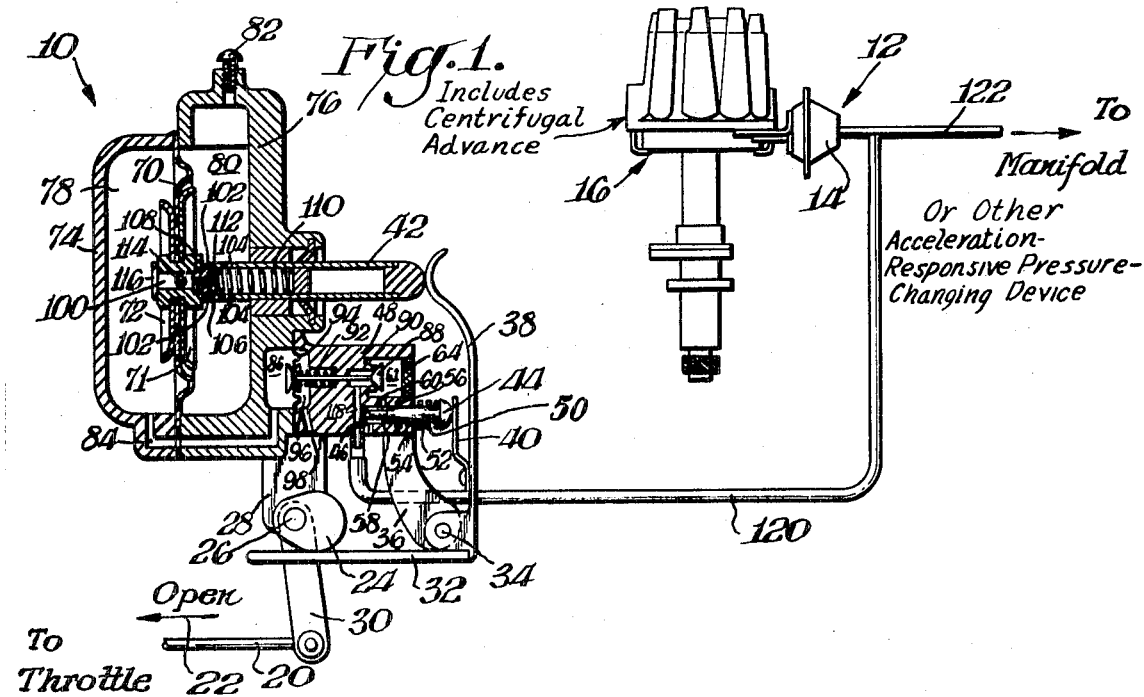
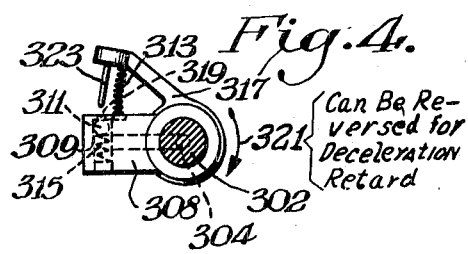
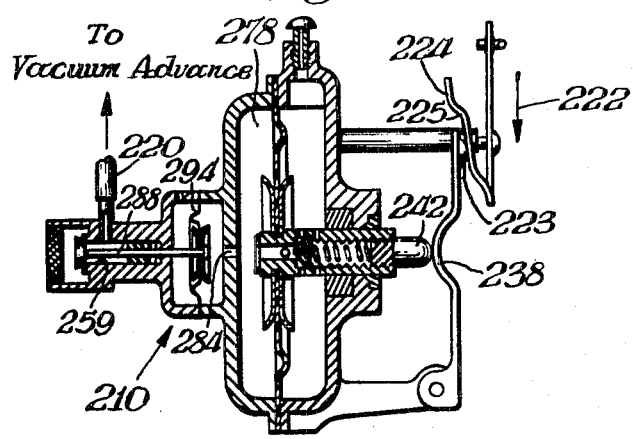
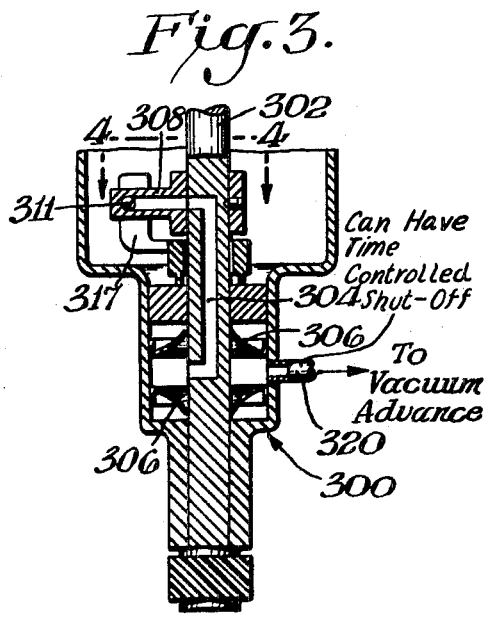

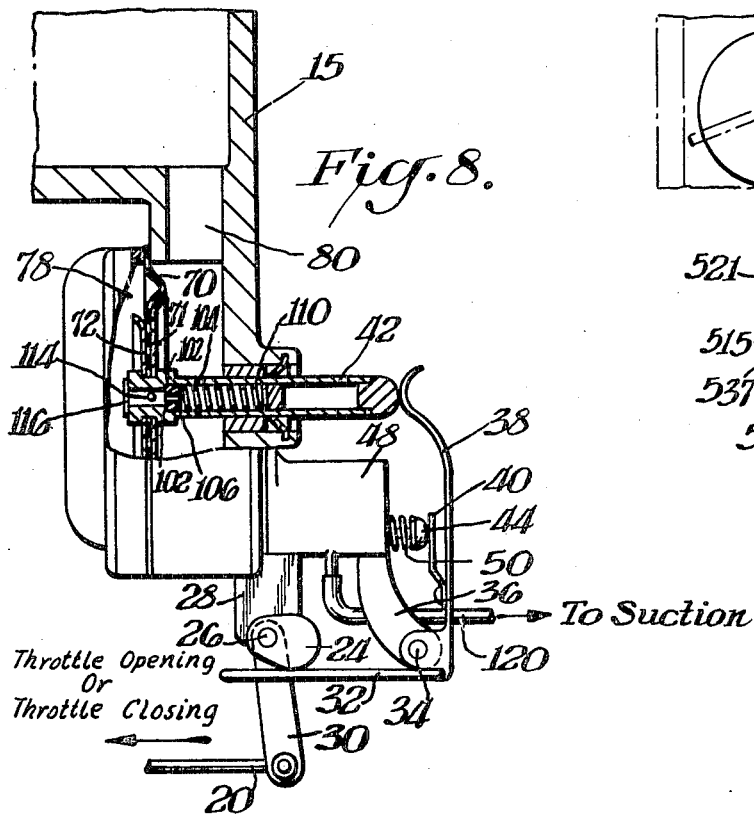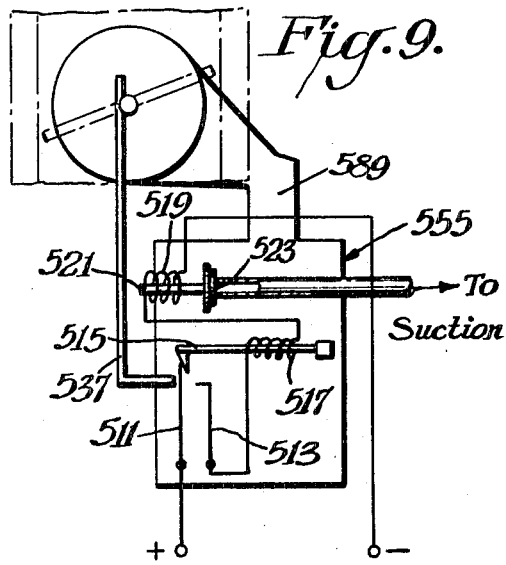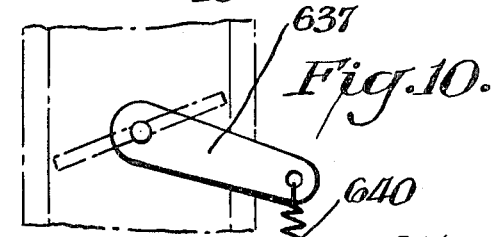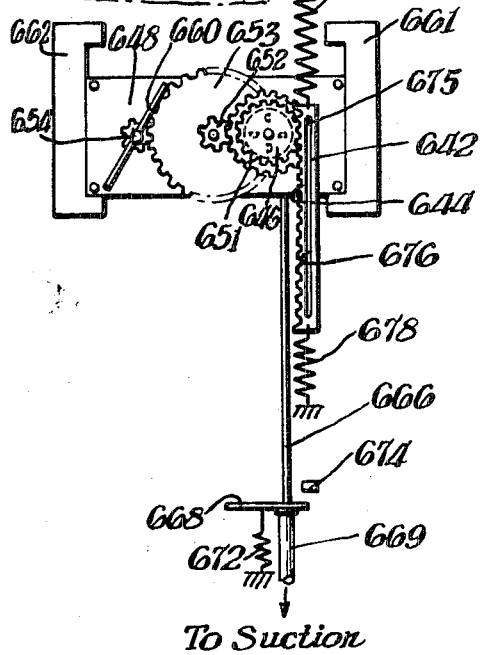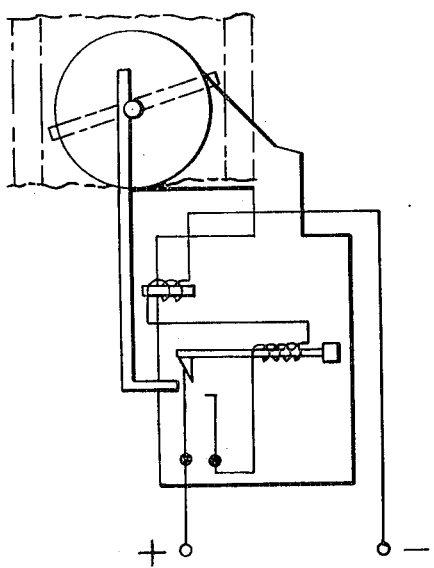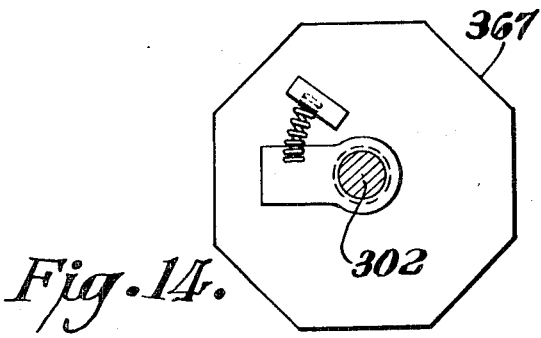

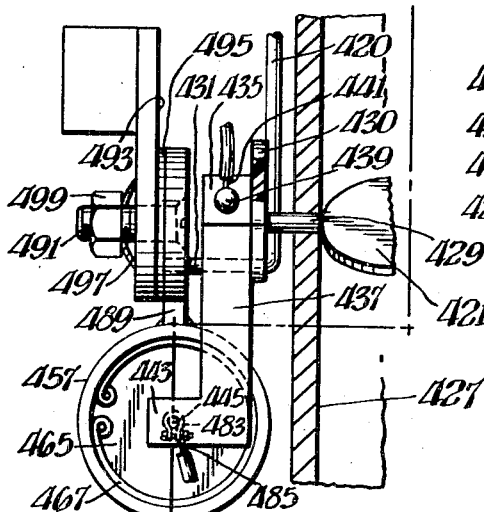
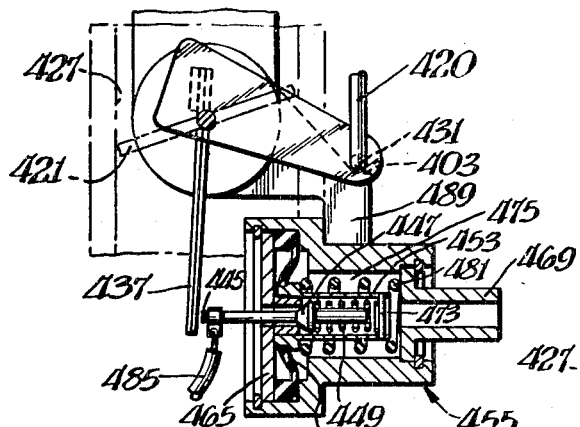
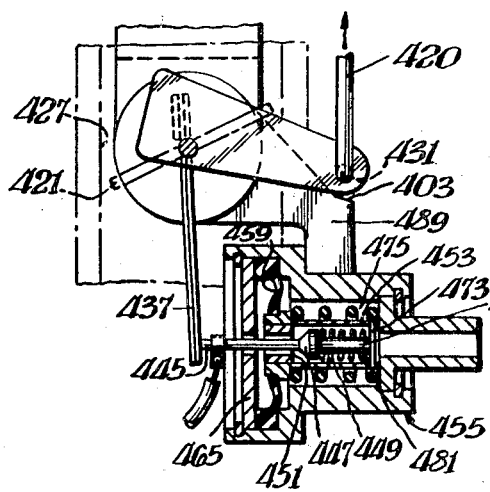
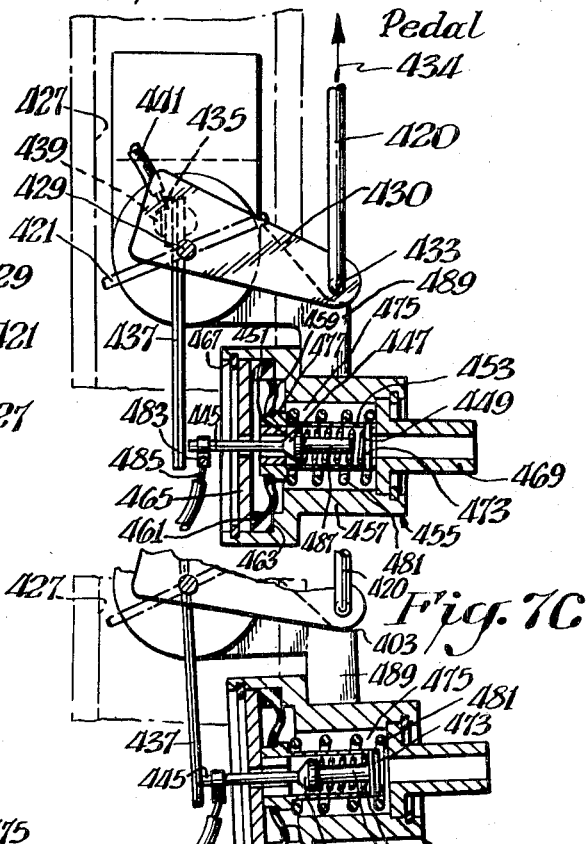
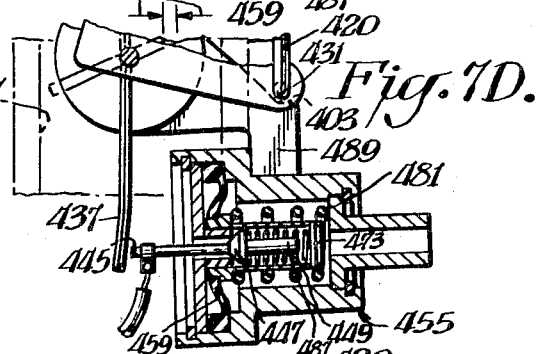
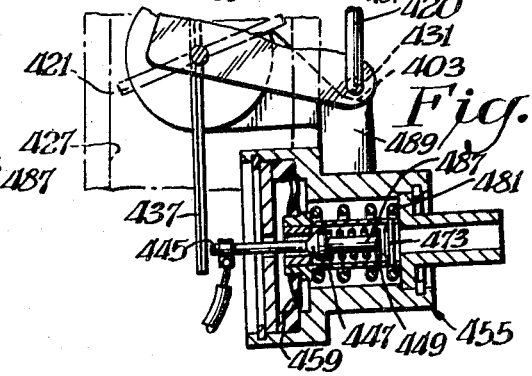

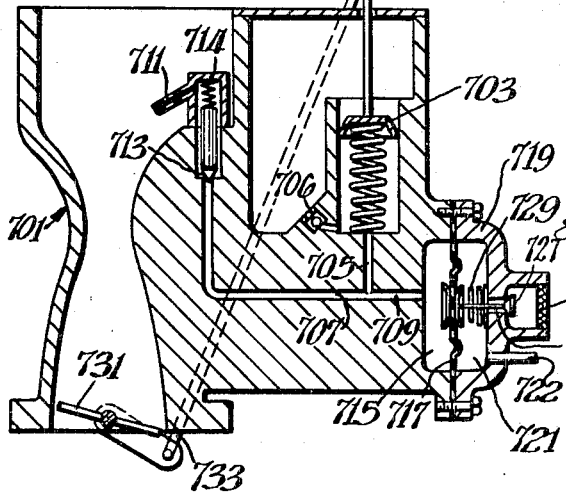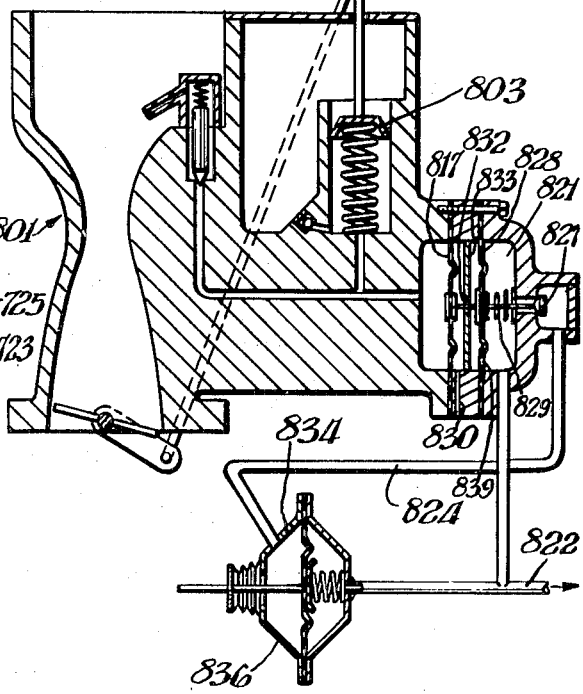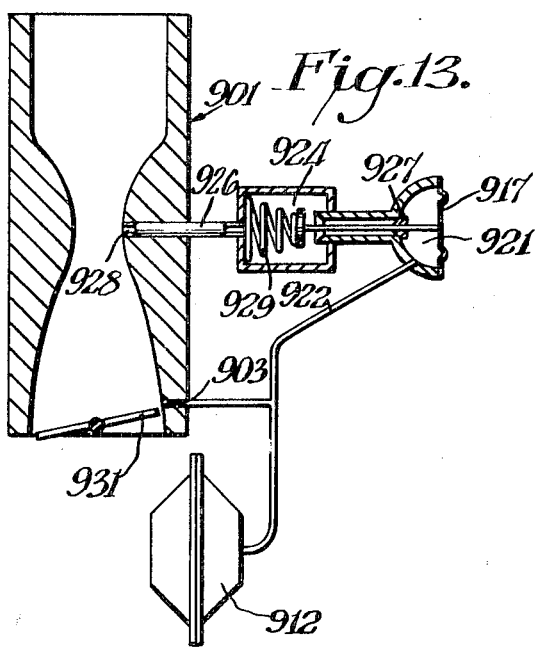

REDUCING ENGINE EMISSIONS

This application is a continuation-in-part of application, Ser. No. 611,346 filed Jan. 24, 1967 and subsequently abandoned.

The present invention relates to spark-ignition engines such as those used to power automobiles.

Among the objects of the present invention is the provision of novel ignition timing arrangements for such engines.

Another object of the present invention is to reduce the emission of undesirable materials in the exhaust of spark-ignition engines.

The foregoing as well as additional objects of the present invention will be more fully understood from the following description of several of its exemplifications, reference being made to the accompanying drawings wherein;

FIG. 1 is a somewhat schematic illustration with parts in section, of one embodiment of ignition-timing arrangement representative of the present invention;

FIG. 2 is a view similar to that of FIG. 1 showing another embodiment of the present invention;

FIG. 3 is a broken-away vertical sectional view of a somewhat different type of ignition-timing arrangement representative of the present invention;

FIG. 4 is a horizontal sectional view of the construction of FIG. 3 taken along lines 4—4;

FIG. 4A is a view similar to FIG. 4 of a modified construction;

FIG. 5 is a partially sectioned and partially cutaway elevational view of a further embodiment of the present invention;

FIG. 6 is a side view of the construction of FIG. 5;

FIGS. 7A through 7E show stages in the operation of the construction of FIGS. 5 and 6; and FIGS. 8 through 14 illustrate other embodiments of the invention.

It has been discovered that spark ignition engines which during mild accelerations have their ignition temporarily sharply retarded for a few seconds, make out much better in smog-emission tests yet do not sacrifice performance characteristics to any significant degree. Only a few to 30 seconds of retarding is needed but the retarding should be sharp, as for example to substantially completely offset the vacuum advance, or to be at least about 10° and preferably 15° with respect to the part-throttle cruise timing advance that would be provided by a combination of centrifugal and manifold vacuum advance mechanisms. The centrifugal advance is solely dependent on engine speed and normally advances the timing as this speed increases. The vacuum advance responds to variations in engine vacuum and normally increases the advance as the manifold pressure drops.

When initiating full throttle accelerations as well as those near full throttle, the manifold pressure will normally increase sharply and cause the vacuum advance mechanism to drop back some from fully advanced position. However, for minor accelerations the manifold pressure will generally not increase enough to drop the timing as much as about 5° from maximum advance for the particular engine speed. Such small retarding is not of much effect in reducing the emission of undesirable exhaust products.

A feature of the present invention is the provision of means responsive directly to acceleration or to an acceleration control to effect the foregoing ignition retarding.

The retarding of the invention can be readily accomplished by entirely or substantially entirely offsetting or eliminating the vacuum advance inasmuch as such advance is normally at least about 15° at cruise. It is preferred for the retarding to be initiated somewhat gradually and terminated somewhat gradually, to avoid abrupt changes in torque. Bleeding air into the vacuum that causes the vacuum advance conveniently accomplishes this type of gradual operation, particularly when the bleeding takes place via an elongated line having an internal diameter about the same size as that of the line that applies suction from the intake manifold to the vacuum advance mechanism. Internal diameters of one-eighth inch with a bleed line at least about 6 inches long make a very suitable combination, the ignition retarding then taking a fraction of a second to reach maximum retard after bleed valve at the remote end of the bleed line is suddenly opened. Similarly the retarding tapers off to full advance over a fraction of a second when the bleed valve is suddenly closed.

The acceleration-responsive means for effecting the ignition retard of the present invention can be connected for mechanical operation directly by the throttle control of the engine, or it can be arranged for operation by the inertia effects of a rotating portion of the engine. The throttle control connection is also conveniently arranged to additionally retard ignition when the engine is idling, to further reduce the emission of undesirables from the exhaust.

As used herein, accelerations refer only to increases in speed, and not to decreases.

Turning now to the drawings, FIG. 1 shows an ignition-timing arrangement having an acceleration-responsive means 10 connected to the conventional vacuum advance mechanism 12 that includes a diaphragm head 14 responsive to the manifold pressure for advancing the breaker plate (not shown) in the distributor 16. Instead of having the diaphragm head connected to the intake manifold, it can alternatively be connected to the carburetor throat downstream of the throttle. Acceleration-responsive means 10 is mechanically connected to the throttle control by a rod 20 that is moved in the direction of arrow 22 when the throttle is opened. Rod 20 rotates a cam 24 which is pivotally mounted by shaft 26 on a block 28 that can be in turn secured to a fixed position on the engine. Cam 24 is rigidly connected to a shaft 26 which also rigidly carries an arm 30 directly operated by rod 20.

A cam-follower plate 32 is held against the bottom of cam 24 and is arranged for pivoting around pin 34 rotatably held on another fixed support 36. Integral with plate 32 and extending upwardly are two actuating fingers 38, 40, shown as engaging plungers 42, 44 respectively. Plunger 44 is a valve needle which cooperates with a valve seat 46 in a valve block 48 but is urged outwardly away from that seat by spring 50. This outward urging causes the plunger 44 to push outwardly against finger 40 and thereby hold cam-follower plate 32 against cam 24. Plunger 44 is shown as guided in its movement by having its shank 52 slidably fitted in a cylindrical socket 54 in block 48 and can also be provided with an O-ring seal 56 to control the flow of bleed air.

The shank of plunger 44 is reduced at 48 to provide a passageway communicating between the valve seat at the bottom of socket 54 and a port 60 that opens into an air inlet chamber 62. An air filter 64 permits filtered air to freely enter the chamber 62 from the outside.

Plunger 42 has secured to its inner end a diaphragm 70 which can be clamped between two cup washers 71, 72 carried by the plunger. Diaphragm 70 is also clamped between a head cover 74 and body 76 of a pneumatic or hydraulic pump assembly to define a pump compartment 78 and a vent compartment 80 on opposite sides of the diaphragm. Vent compartment 80 is open to the atmosphere as by means of perforated plug 82, while pump compartment 78 communicates through passageway 84 with an actuating chamber 86 of a second bleed valve 88. Valve 88 is urged against its seat 90 by a spring 92 and this valve is also secured to a diaphragm 94 that closes the actuating chamber 86. A cavity 96 on the other side of diaphragm 94 is opened to the atmosphere by means of vent 98.

Pump compartment 78 also has a vent connection but of limited character. This vent connection is established through a longitudinal opening 100 drilled through the bottom of plunger 42 and leading into the interior of the plunger which itself is hollow and has vent perforations 102, 104 in its walls. Inside the plunger's hollow interior, which is wider than opening 100, is fitted a movable valve seat 106 urged towards the shoulder 108 at the inner end of opening 100, by a spring 110. Valve seat 106 also has a longitudinal passageway 112, the outer mouth of which is adjacent a ball check 114 held in place in opening 100 as by means of a retainer bar 116. The outer mouth of passageway 112 is arranged to form an imperfect seat for the ball check 116 so that air or other fluid can leak from pump compartment 78 past the ball check through passageway 112, the hollow interior of plunger 42, vent perforations 104, vent compartment 80, and from there to the atmosphere. The imperfect seating of ball check 116 is readily arranged as by punching a very small groove across the face of the seat in one or more locations. Movable valve seat 106 is also arranged to seat against shoulder 108 to provide another airtight or almost airtight closure.

The two bleed valves 44 and 88 are connected in parallel between the atmosphere and a bleed passageway 118 in valve block 48 which in turn communicates through bleed tube 120 to the suction line 122 of the vacuum advance mechanism.

The apparatus of FIG. 1 is shown in the position it occupies when the engine's throttle is at its idle stop. Plunger valve 44 is held open by spring 50 and the second bleed valve 88 is held closed by spring 92. Air accordingly bleeds from chamber 62 through port 60 past valve seat 46 and into suction line 122 so that the pressure in that suction line and in diaphragm head 14 is fairly close to atmospheric. The vacuum advance is accordingly in its retarded position and the ignition is timed about 15 crankshaft degrees later than it would be if the vacuum advance were in full advance position. Vacuum advance mechanisms generally cause the advancing of the ignition timing to begin when the pressure in diaphragm head 14 is at least a few inches of mercury below atmospheric so that the mechanism will provide no advance as long as the bleeding of the acceleration-responsive means is effective to keep the pressure in suction line 122 above that level.

Every time there is an opening movement in the throttle of the engine operated in accordance with FIG. 1, fingers 38 and 40 move toward the left. Finger 40 is made quite springy and yieldable so that it only effects closing of plunger valve 44 when the engine throttle begins to move away from idle position. Further movement of the throttle away from idle position will merely cause finger 40 to yield while finger 38, which is much more rigid, will continue to move toward the left. Any movement of finger 38 towards the left causes plunger 42 to move toward the left, increasing the pressure in pump compartment 78. This increase in pressure causes ball check 114 to seat against the mouth of passageway 112 and also pumps additional fluid into actuating chamber 86, thus pushing diaphragm 94 to the right and unseating bleed valve 88. This also causes the loss of vacuum advance and a consequent 15° delay in ignition timing.

After a throttle-opening movement is completed the pressure increase thereby caused in pump compartment 78 begins to drop off as fluid bleeds past the imperfect seat between ball check 114 and the outer mouth of passageway 112 in the movable seat 106. A few seconds is all that is needed for this pressure to drop enough to permit bleed valve 88 to be reseated by its spring 92. This reseating terminates the bleed of air into suction line 122 and the normal vacuum advance is thereby restored.

Movements of the throttle in throttle-closing direction cause the diaphragm 70 to move to the right, reducing the pressure in pump compartment 78 and permitting fluid to move through passageway 100 from vent compartment 80 pushing the ball check away from the outer mouth of the passageway. The acceleration-responsive means is accordingly ready at all times to respond to any acceleration.

FIG. 2 shows an acceleration-responsive mechanism 210 basically similar to that of mechanism 10 of FIG. 1 but without the idle bleed arrangement and with a modified control connection. Apparatus 210 has a bleed line 220 that opens into a bleed port 259 normally held closed by valve 288 which is actuated by diaphragm 294, which in turn is operated from pump compartment 278 through a passageway 284, as in the similarly numbered parts of the construction of FIG. 1. Plunger 242, which is arranged to do the pumping, is engaged by finger 238 which in turn is controlled by cam 224 which is moved in the direction of arrow 222 when the throttle of the engine is being opened. Cam 224 has an operating ramp 225 that is engaged by a follower nose 223 secured to an extension of finger 238. Ramp 225 is shown as shaped so as to have relatively small movements of finger 238 when the engine's throttle is opened at near idle position, but relatively large movements when the throttle is moved towards open position from positions closer to full open. In this way the ignition retarding of the present invention can have a longer duration at the higher speeds where acceleration is less pronounced than at the lower speeds. At the lower speeds, for example, the retarding interval can be as little as 2 seconds and at the higher speeds as much as 4 seconds.

FIGS. 3 and 4 illustrate a modification of the invention in which the acceleration-responsive means is built into a distributor assembly. The lower portion of such an assembly is shown at 300 with the distributor shaft 302 having a longitudinally extending air passageway 304, the lower end of which is connected by rotating seals 306, 306 to a bleed tube 320. The upper end of passageway 304 extends through a radially directed arm 308 where it terminates in a check chamber 309 that is closed by a ball check 311 that covers a vent port 319. A spring 315 biases the ball check against the port and in this way closes the passageway 304.

Radial arm 308 is rigidly secured to distributor shaft 302 so as to turn with it. Rotatably mounted with respect to the shaft is an inertia arm 317 which is rotated by radial arm 308 acting through a compression spring 313. The direction of rotation of distributor shaft 302 is indicated by the arrow 321 in FIG. 4, and spring 313 is arranged so that any acceleration of the engine causes this spring to be compressed by the inertia of inertia arm 317. When the acceleration is completed this spring will extend itself again and return the inertia arm to normal position with respect to radial arm 308.

An unseating pin 323 carried by inertia arm 317 is arranged to penetrate through vent port 319 and push ball check 311 away from its seating engagement whenever the inertia arm is moved close to the radial arm. As a result every acceleration of sufficient magnitude to cause unseating of the ball check will also cause venting of the vacuum advance unit and retarding of the ignition. Such retarding will continue throughout an entire acceleration.

FIGS. 5 and 6 illustrate a construction in which the vacuum bleed is electrically timed. These figures show a throttle valve 421 in a carburetor throat 427 affixed to and rotatable on a shaft 429 that carries an electrically nonconductive throttle arm 430. Link 420 having an end 431 bent over and inserted through an aperture 433 in arm 430 connects that arm to a throttle pedal of an automobile for example, so that movement of the throttle pedal will move link 420 in the direction of the arrow 434 to cause the throttle valve 421 to move toward fully open position. Correspondingly, moving the throttle pedal in the opposite direction will move the throttle valve toward closed position, and this motion can be assisted as by a return spring.

The throttle arm 430 can be molded of plastic with the molding providing the aperture 433, and also providing an integral ear 435. On this ear is mounted one end of a bimetallic temperature-responsive strip 437 as by means of a rivet 439 which also secures an electrical lead 441 to the strip. The other end 443 of the bimetallic strip coacts with the stem 445 of a poppet valve 447 the head of which is biased as by spring 449 against a seat 451 carried by a floating cylinder 453 of a bleed control assembly 455. The cylinder is secured to a housing 457 of the bleed control assembly by a flexible diaphragm 459, the outer margin 461 of which is thickened and clamped against a shoulder 463 of the housing, by means of a mounting plate 465 loosely fitted around valve stem 445 and held in place by a snapring 467. The central edge of the diaphragm can be vulcanized directly to an external shoulder 477 at the valve end of cylinder 453.

A suction connection 469 opens into the interior of the housing 457 and receives a suction line such as that shown at 120 (FIG. 1) connected to the vacuum advance system of the distributor. Cylinder 453 is hollow and its interior is in open connection with the suction connection 469, although the open end of the cylinder can be partially obstructed as by a bar 473 against which spring 449 is compressed. The diaphragm may permit the cylinder to move so far inwardly that its open end engages a wall of the housing 457 or of the suction connection 469, but in that event the cylinder end can have a cutout or the like so that such engagement does not obstruct the flow of air between suction connection 469 and the space 475 around the cylinder. Another spring 481 is positioned in this space and arranged to bias cylinder 453 toward mounting plate 465.

Poppet valve 447 has at least its stem 445 of electrically conductive material, and to this stem is connected as by clamp 483, an electrical lead 485. Valve 447 also has a nose 487 that projects internally of the cylinder 453 and comes close to but is spaced from bar 473 when the valve is in its seated position.

The bleed control assembly 455 is carried by a pivot arm 489 to which housing 457 may be welded, and the arm in turn is frictionally held by a pivot screw 491 against a fixed surface 493. A friction pad 495 between the pivot arm and the surface 493 is engaged by both of these members under the influence of a cupped spring washer 497 around the screw 491 where it is held in place by a nut 499.

The construction of FIGS. 5 and 6 operates by connecting leads 441 and 485 to a source of electric current such as a battery of an automobile having an engine equipped with a carburetor so modified. FIG. 7A shows the condition of the vacuum bleed assembly when the engine is not running and the throttle is closed. Throttle valve 421 is in idle position and bent over end 431 of throttle link 420 engages an abutment 403 on pivot arm 489 to hold the bleed assembly in the illustrated position. This position corresponds to the extreme limit of its clockwise rotation of the assembly around pivot screw 491. In this position valve 447 is held against its seat by spring 449, and the seat end of the cylinder 453 is held against mounting plate 465 by spring 481. This arrangement holds valve stem 445 in its extreme left-hand position where it still falls short of engaging the bimetallic strip 437. When the engine is started and is running just above idle, the apparatus takes the position illustrated in FIG. 6. In this position intake manifold suction is applied through connector 469 to space 475 and causes the diaphragm 459 to flex to the right carrying cylinder 453 and valve 447 with it. The shank of the valve is still out of contact with bimetallic strip 437 even though that strip has been pivoted with the throttle to the off-idle position.

Should the throttle now be opened a little further, then bimetallic strip will engage the valve stem 445 and then push the shank to the right unseating the valve, as illustrated in FIG. 7B. Air is thus admitted into the suction chamber and causes the ignition to be retarded as in the construction of FIG. 1. As a result the pressure in space 475 increases and diaphragm 459 is moved to the left carrying cylinder 453 with it. Bar 473 at the interior end of the cylinder engages valve nose 487 as the cylinder moves toward the left, and causes the valve stem to press against bimetallic strip 437. The friction of the pivot arm 489 is adjusted to be low enough so that instead of the valve stem pushing the bimetallic strip to the left under the above pressure, the assembly 455 is pivoted to the right or counterclockwise. The assembly thus reaches the position illustrated in FIG. 7C. Arrows 407 show the amount of tilt which the assembly has undergone.

The above shift in the assembly takes place fairly rapidly, and is accompanied by a flow of electric current through the bimetallic strip as a result of its contact with the valve stem. This current heats up the bimetallic strip and after a few seconds causes it to deflect away from the valve seat. The deflection proceeds more than enough to permit the valve to reseat itself, and thus breaks the electrical connection between the strip and the valve stem. The assembly is now in the position illustrated in FIG. 7D.

The reseating permits intake manifold suction to be reestablished in space 475 causing diaphragm 459 to be pulled toward the right carrying the cylinder and valve with it. At the same time the breaking of the electrical connection stops the heating of the bimetallic strip and permits that strip to unflex. The combined result is to bring the apparatus into the position shown in FIG. 7E. In this position the assembly is ready for the next acceleration with the free end of the bimetallic strip close to but just out of contact with valve stem 445. Additional accelerations will cause the assembly to go through the same kind of cycle, each acceleration carrying the assembly a little further counterclockwise around pivot screw 491. Closing movements of the throttle will cause bentover end 431 of throttle link 420 to rotate the assembly clockwise as the throttle valve moves towards closed position, thus keeping the parts of the apparatus so related that it is always ready for the next acceleration.

The bimetallic strip 437 and the electric supply to it are arranged to cause the strip to undergo its maximum deflection as in FIG. 7D about 2 to 4 seconds after the current flow starts, so that the ignition retarding action is completed within such time period. The strip can be relatively insensitive to small temperature changes so that it is not deflected by variations in ambient temperatures such as between summer and winter and between hot and cold conditions of the engine. The heating current can thus be arranged to heat the strip to 150° C. or higher in order to effect the desired deflection. The engaging surfaces of strip 437 and shank 435 can be of good electrical contact material such as silver, in order to have a long life in use.

The delay feature used in the construction of FIG. 1, for example, to extend the retarding for a few seconds after the throttle begins the throttle-opening movement, can be effected by other forms of dashpots, such as a hydraulic dashpot that can be conveniently operated with gasoline as the liquid, by linking the dashpot to the carburetor bowl.

A construction of this type is shown in FIG. 8 which illustrates the apparatus of FIG. 1 modified to have chamber 80 opening into the fuel bowl 15 of a carburetor so that this chamber as well as chambers 78, 86 and passageway 84 (see FIG. 1) are filled with gasoline at all times. The operation of FIG. 8 corresponds to that of FIG. 1.

Electrically or mechanically operated delays can also be used such as by having a throttle-opening movement close an electric switch that heats up a catch which is released after the heating is maintained for a few seconds. FIG. 9 illustrates a construction of this type in which a control assembly 555 is mounted on a pivot arm 589 frictionally held in the same way as arm 489 of the construction of FIG. 6. A rotating arm 537 mounted for rotation with the throttle valve, as in FIG. 6, bends a switch blade 511 carried by pivot arm 589 into contact engagement with a contact blade 513, and into latching engagement with a bimetallic catch 515.

Catch 515 is surrounded by a heating coil 517 which is energized by a circuit closed by the contacts. The circuit also includes a solenoid 519 with an armature 521 that when actuated lifts a flapper valve 523 from the vacuum advance line and also pushes against the actuating arm 537 to rotate the assembly 555 around its pivot. After a few seconds of electric current flow the catch is heated enough to deflect it out of the way and permit switch blade to move away from control blade 513 breaking the electrical current. Blade 511 and flapper valve 523 are biased to their illustrated positions so that the assembly then restores the suction in the vacuum advance mechanism. The operation of this construction is accordingly similar to that of FIG. 6.

Other forms of delay include the pneumatic type which is based on the resistance to the rotation of a rapidly rotated air vane, as in spring-wound music box movements. Thus the opening movement of the throttle can wind a spring for rotating the vane, and the ignition retard effected for the time needed by the vane to run down the spring. An arrangement of this type is illustrated in FIG. 10 where a throttle arm 637 is connected by a spring 640 to a rack 642 that has a row of gear teeth 644 meshed with the teeth of a drive gear 646 that is rotatably mounted on a frame 648. Gear 646 has a one-way drive connection with a set of speed-increasing gears 651, 652, 653, 654, the last being on a stem that also carries a vane 660. Frame 648 is held between guides 661 and 662 that allow for limited motion toward the throttle arm 637. A link 666 is connected between frame 648 and a flap valve 668 on suction conduit 669 which valve is biased as by a spring toward a position closing the open end of that conduit. An additional stop 674 can be provided to limit the opening of the flap valve 668. Rack 642 is held on frame 648 as by a guide pin 675 fixed to the frame and received in a guide slot 676 extending along the length of the rack. A return spring 678 substantially lighter than the spring 640 urges the rack 642 in a direction away from the throttle arm 637.

When the throttle arm 637 of the construction of FIG. 10 is moved in throttle-opening direction it stretches spring 640 and thus applies an upward force to rack 642 which in turn starts to rotate drive gear 646. In this direction of rotation gear 646 is engaged with vane 660, so that its rotation is considerably slowed as a result of the air resistance against rotation of the vane. Rack 642, urged upwardly by stretched spring 640, accordingly lifts frame 648 and with it the flap valve 668. The suction conduit 669 is in this way opened to the air, sharply reducing the suction as well as the ignition advance as in the constructions of the previous figures. The flap valve remains lifted until the vane 660 has rotated enough to permit rack 642 to relax spring 640. Return spring 672 thereupon pulls the flap valve down into position closing suction conduit 669 and also lowering frame 648. Further opening movements of the throttle will cause repetitions of the above ignition retarding action.

Closing movements of the throttle carry throttle arm 637 closer to frame 648 permitting spring 678 to pull the rack 642 back so that it is ready for the next throttle opening movement. During the backward travel of the rack it is still meshed with one-way drive gear 646 but this gear turns easily in the direction that brings the rack down, without driving vane 660.

An inertia delay can also be used, as by similarly winding a spring that is connected to rotate a relatively heavy weight. The weight can be so arranged that it takes a few seconds for the weight to rotate sufficiently to cause the spring to unwind. Such an arrangement is provided by replacing vane 648 in the construction of FIG. 10 by a wheel with a heavy rim. The inertia of such wheel as it is subjected to the influence of the speed increasing gear drive provides a delaying effect similar to that of the air resistance against the vane 660.

It will be noted that with the type of construction illustrated in FIGS. 3 and 4, or in any other arrangement which causes the ignition retard of the present invention in response to the inertia effects of the acceleration to be responded to, no delay is needed to extend the duration of the retard. It may, however, be helpful in such arrangements to terminate the ignition retard before the acceleration terminates, as by providing a time control valve inserted in bleed tube 320 to shut down the bleed after a few seconds of retarding have been completed. Alternatively the housing for the distributor of FIG. 3 can be made almost completely airtight so that it provides an air reservoir of limited capacity. Accordingly when a vacuum bleed is effected the limited amount of air within the housing will limit the duration of the vacuum drop. When the air within the housing is bled into the vacuum line sufficiently the pressure within the housing will be effectively reduced to that normally in the vacuum line and the ignition retard thus terminated. Air will gradually leak into the housing from the exterior so that after the bleed opening is closed, the equipment will soon be ready for the next mild acceleration.

The actuation of the ignition retarding of the present invention can be provided by other arrangements, as by the acceleration pump which is conventionally used in carburetors. The hydraulic pressure developed when the pump is operated can be very simply arranged to push open the bleed valve of FIG. 8, for instance. Such a construction is illustrated in FIG. 11.

In FIG. 11 a carburetor 701 has an acceleration pump 703 connected by outlet passageways 705, 707 to a discharge nozzle 711 provided with a check valve 713 biased to closed position as by spring 714. This check valve is arranged to have a small leak when it is closed, as by burring its seat. Pump 703 is also connected via a branch passageway 709 to an actuating chamber 715 closed by a flexible diaphragm 717 held in place by a suction head 719. Head 719 is hollow, forming a suction chamber 721 connected to the suction line 722 and having a bleed aperture 723 communicating to the ambient air through a filter 725. The outer end of aperture 723 acts as a valve seat for a valve member 727 secured to and movable with the diaphragm 717. A spring 729 around the stem of the valve member urges the diaphragm to the left away from head 719 and thus holds the valve member 727 closed against its seat under steady conditions when the carburetor throttle 731 is not being moved. The spring opposes the distributor-actuating suction supplied to chamber 721 as well as the hydraulic pressure in chamber 715.

When the throttle is opened, a link 733 and lever 735 causes the pump 703 to pump out gasoline, increasing the pressure in passageway 707 until valve 713 is opened. This pressure increase also moves diaphragm 717 to the right, opening the valve 727 and permitting air to bleed into the suction line 722. Termination of the throttle opening movement permits the pressure in passageway 709 to be relieved by way of the small leak in valve 713. This returns diaphragm 717 to its illustrated position where it holds valve 727 closed, permitting the suction in line 722 to reach its equilibrium value and appropriately advance the ignition. Gasoline refills the accelerator pump by flowing from the carburetor bowl through ball check valve 706, as the throttle moves in the closing direction. The apparatus is accordingly always prepared for acceleration.

The ignition retarding of the present invention can also be effected by replacing the normal vacuum advance mechanism 12 (FIG. 1) with a retarding mechanism and arranging for the ignition timing to otherwise be in the fully advanced condition for most economical operation. The breaker plate which carries the cam follower for the breaker cam can still be connected to a diaphragm control, but such connection is arranged to move the breaker plate in ignition-retarding direction in response to diaphragm-operating forces such as are available from a convenient suction or pressure line. An acceleration-responsive mechanism such as any of those described in the foregoing constructions can then be connected to cause the suction or pressure to operate the diaphragm and thus provide the ignition retarding when it is needed.

A still further arrangement pursuant to the present invention is to mount the usual distributor rotor cam on its shaft in such a way that the cam has its position retarded by accelerations. Instead of having the cam fixed on the shaft, it can in this arrangement be loosely rotatable with respect to the shaft, and held by a spring in the desired cruise position, just as arm 317 of FIG. 4 is held. When the engine undergoes an acceleration the inertia of the cam causes it to compress the holding spring enough to establish the desired retard. FIG. 4A shows such an arrangement, the cam 367 being shown rotatably mounted with respect to the distributor shaft 302.

FIG. 12 illustrates a modified form of the construction of FIG. 11 in which the vacuum advance is offset without significantly changing the degree of vacuum in the vacuum advance line. In FIG. 12 the carburetor 801 of essentially the same construction as carburetor 701, has a diaphragm 817 connected to similarly respond to pressure increases in the acceleration pump discharge line. Diaphragm 817 is arranged to operate a valve 827 which controls the application of distributor-advance vacuum from line 822 to line 824 and in this way to a retard chamber 836 where it opposes the ignition-advancing effect of the vacuum in line 822. A vacuum chamber 821 on carburetor 801 communicates with vacuum line 822 and is closed by an auxiliary diaphragm 828 also connected to valve 827. The space between diaphragms 817 and 828 is divided by a partition 833 which has a seal 832 for the passage of the valve actuator, and a vent as shown at 830 vents the space between diaphragm 817 and the partition to make sure suction chamber 821 is isolated from the gasoline on the bowl side of diaphragm 817. A small external air leak 834 is shown in the outer wall of retard chamber 836 to slowly relieve the suction developed in that chamber and thus terminate the ignition-retarding action after valve 827 is closed. A bleed 839 can also be provided in diaphragm 828 to balance the pressures on both sides of this diaphragm so that valve-closing spring 829 can be accurately calibrated.

When the throttle of carburetor 801 goes through movement in the opening direction, its acceleration pump is operated causing diaphragm 817 to move to the right as in the construction of FIG. 11. This opens valve 827, causing the ignition-advancing vacuum to be applied to retard chamber 836, thus retarding the ignition. When the throttle-opening movement is completed, diaphragm 817 returns from its right-hand deflection causing valve 827 to close and the suction in retard chamber 836 is then dissipated by air coming in through leak 834. This permits the ignition to be advanced under the influence of the suction in line 822.

When the ignition retarding of the present invention is arranged to take place during accelerations of at least about one mile per hour per second, the emission of hydrocarbons in the exhaust is reduced about 23 percent in the California emission tests. In one instance the reduction was from 181 parts per million to 139 parts per million in a vehicle that had already been equipped in accordance with FIG. 1 of the U.S. Pat. 3,310,045, granted Mar. 21, 1967, to have very low emission even without the present invention.

The present invention also reduces nitrogen oxide emissions about 22 percent. In the hot cycles of a typical California test the reduction was from 1,517 parts per million to 1,185 parts per million in the above-described engine.

The operation of an automobile with an engine having an ignition-timing arrangement in accordance with the present invention, is not perceptibly different from that which is provided by the prior art type of ignition-timing arrangement. The retarding that is effected in accordance with the present invention tends to reduce the engine's torque slightly but this is not noticed by the driver inasmuch as the throttle is being opened and this causes a net increase in torque. It is not necessary to make any special provisions to take care of throttle manipulations associated with the cranking and starting of an engine. Intake manifold suction does not reach any significant level until a cranked engine begins to fire regularly, so that before such occurrence the apparatuses of FIGS. 1, 2, 3, 5, 8 and 9 have no effect. During cranking the battery current supply to the electrically timed constructions of FIGS. 5 and 9 is so low that they will not begin to operate or begin to operate well, and a small closing movement of the throttle after the engine has started running will prevent the vacuum bleed otherwise associated with throttle-opening movements of most of the constructions during the engine starting. The latching action in the construction of FIG. 9 will cause the apparatus to go through a vacuum bleed as a result of such throttle-opening movements.

There is a somewhat greater consumption of fuel caused by the present invention but since the mild accelerations during which the retarding of the invention takes place constitute only a relatively small portion of the total engine operation, the increase in consumption is generally not significant.

The bleeding into the vacuum line that effects spark advance is not limited to being accomplished by opening the vacuum line directly or indirectly to the ambient air. The bleed opening can instead be made to other bleed sources such as the carburetor venturi or even to a high pressure air supply. A venturi-connected bleed is particularly desirable in that the bleed then varies with the air flow rate through the carburetor. As a result the bleed rate diminishes as acceleration proceeds, and the net effect can be used to keep the controlled vacuum approximately constant.

FIG. 13 illustrates the latter construction. A carburetor bore is here shown at 901 and it is provided with a vacuum advance port 903 just above the upper edge of throttle plate 931. The vacuum advance port communicates with the usual ignition advance suction head 912 and also by way of passageway 922, suction control valve 927, and passageways 924, 926 to a restricted bleed port 928 in the throat venturi. VAlve 927 is connected to and operated by a diaphragm 917 that defines a suction control chamber 921 and the valve is biased by a spring 929 toward open position. This spring keeps the valve open so long as the vacuum in chamber 921 is weaker than that provided under cruise conditions. When undergoing a mild acceleration from such conditions port 903 is effectively exposed to intake manifold vacuum and that vacuum becomes less intense, permitting valve 927 to open the bleed path. Because air is now moving through the venturi the bleed is not as complete as the venting in the construction of FIG. 1 for example. The vacuum in line 922 and in the suction advance head 912 might therefore drop to about 7 inches of mercury for example. Most of the vacuum advance will still be dissipated and as the automobile accelerates air moves through the carburetor venturi more and more rapidly, the effectiveness of the bleed diminishes and the 7 inch level can be maintained with very little or no variations. The completion of the acceleration will carry the vacuum in line 922 to the normal level, causing diaphragm 917 to close bleed valve 927. This restores the full vacuum advance along with its good fuel economy and performance.

The bleed can also be arranged to reduce the vacuum intensity to other predetermined levels, even down to as little as 4 inches of mercury or less, at which low level all the normal vacuum advance is lost.

It is accordingly possible to have the construction of FIG. 13 adjusted to have its mild acceleration retard take place with the advance vacuum selected for best operation of the particular engine and automobile to which it is fitted. Thus with an engine that is operated with very lean fuel mixtures, the mild acceleration retard preferably corresponds to only about three-fourths of the vacuum advance or even less unless the engine is not expected to provide flashy performance.

The construction of FIG. 13 has its vacuum port 903 located so that there is no vacuum advance when the engine is idling, the advance commencing as the throttle is opened. This construction is particularly desirable for use with mild acceleration retarding since the ignition system is not in full advance condition when an acceleration begins from very low speeds. Accordingly there is no delay required to bleed advancing vacuum before the retarding commences. Also the bleed arrangement of the construction of FIG. 13 reduces its effectiveness as the engine speed increases, and so for turnpike driving and the like there is very little or no mild acceleration retarding. Such driving can accordingly be carried out with maximum fuel economy and maximum engine performance. On the other hand for city driving where nitrogen oxide concentrations are most serious the bleeding of the construction of FIG. 13 is fully effective.

The ignition retard by shifting of the breaker plate for example, can also be effected by nonpneumatic means, as by an electromagnet connected to move the plate into retard position in response to an electric current sent through the magnet by an acceleration-responsive switch as in the constructions of FIGS. 5 and 9. This construction is shown in FIG. 14 which is a modification of FIG. 9 in which solenoid armature 521 is directly connected to the breaker plate.

Another aspect of the present invention is the retarding of the ignition during decelerations of an automobile operated by a spark-ignition engine. Retarding of the ignition at such times also reduces undesired emissions and in addition improves the engine braking. For this type of operation the constructions of FIGS. 1, 5, 8, 9 and 10 can be modified (see FIG. 8) so that they cause bleeding in response to throttle-closing movements rather than throttle-opening movements. Similarly the construction of FIGS. 3 and 4 can be reversed so that the bleeding it causes takes place only during decelerations. Such deceleration retarding is particularly helpful when the throttling is arranged to keep the engine firing during deceleration as by a throttle-closing check and/or increase of the idle mixture flow rate along the lines described in U.S. Pat. No. 3,282,261 granted Nov. 1, 1966. With the increase in idle mixture flow rate it is also desirable to keep the ignition timing retarded during idle operation as by combining the deceleration control with an idle control, as in the construction of the present FIG. 1, for example.

Obviously many other modifications and variations of the present invention are possible in the light of the above teachings. Within the scope of the appended claims the invention may accordingly be practiced otherwise than as specifically described.

What is claimed:

1. In an ignition timing mechanism that is vacuum-responsive and speed-responsive and keeps the ignition timing of a spark-ignition engine highly advanced during constant speed operation under part load, the improvement according to which supplemental timing control means is connected to the timing mechanism to cause the ignition advance to be retarded at least about 10° from said highly advanced condition for a few seconds when the engine is operated to effect mild acceleration, said supplemental timing control means being essentially insensitive to influences other than accelerations.

2. The combination of claim 1 in which the supplemental timing control means is connected to gradually apply and gradually terminate the ignition retarding.

3. The combination of claim 1 in which the supplemental timing control means is connected for operation by the inertia of a rotating portion of the engine.

4. The combination of claim 1 in which the ignition timing mechanism is further connected to cause the ignition advance to be retarded during idling of the engine.

5. The combination of claim 1 in which the supplemental control includes terminating structure that terminates its retarding action a few seconds after that action starts.

6. In an ignition timing mechanism having a vacuum-responsive and speed-responsive advance arrangement connected to advance the ignition timing of a spark-ignition engine by amounts that essentially provide good fuel economy, the improvement according to which engine-responsive retard means is connected to the timing mechanism to temporarily offset the vacuum advance about 10° for a period of at least a few seconds whenever the engine is operated to effect mild acceleration.

7. In a spark ignition engine timing combination having a first timing mechanism that advances the ignition timing with increases in engine speed and a second timing mechanism that advances the ignition timing with decreases in pressure in the combustion mixture intake system, the improvement according to which a third timing mechanism is connected to the second timing mechanism and to the engine and has momentary control means that offsets the timing action of the second timing mechanism for only a few seconds whenever the engine is operated to effect mild acceleration.

8. The combination of claim 7 in which the third timing mechanism is electrically timed.

9. The combination of claim 7 in which the third timing mechanism is pneumatically timed.

10. An ignition retard assembly for a spark ignition engine having a carburetor venturi, speed-responsive ignition advance means and intake-manifold-vacuum-responsive ignition advance means, said assembly having a bleed connection for reducing the advance of the last-mentioned means, the bleed connection opening into the carburetor venturi so that bleeding takes place from the venturi, and an acceleration-responsive control connected to said bleed connection to open and close said connection in response to an acceleration.

11. The combination of claim 10 in which the assembly is connected to maintain a substantially constant vacuum advance during a mild acceleration.

* * * * *